United States Patent
Sasaki

(10) Patent No.: US 6,657,411 B1
(45) Date of Patent: Dec. 2, 2003

(54) POSITION CONTROLLER

(75) Inventor: Tadashi Sasaki, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/260,730

(22) Filed: Mar. 3, 1999

(30) Foreign Application Priority Data

Mar. 5, 1998 (JP) .......................................... 10-053777

(51) Int. Cl.[7] ................................................. G05B 6/02
(52) U.S. Cl. ........................ 318/490; 318/619; 318/663
(58) Field of Search ............................... 318/490, 691, 318/615, 619, 663, 677

(56) References Cited

U.S. PATENT DOCUMENTS

| | | | | |
|---|---|---|---|---|
| 4,617,503 A | * | 10/1986 | Davis et al. ................. | 318/572 |
| 4,625,158 A | * | 11/1986 | Taenzer ....................... | 318/701 |
| 5,721,585 A | * | 2/1998 | Keast et al. .................. | 348/36 |
| 5,786,678 A | * | 7/1998 | Kobayashi et al. ......... | 318/677 |

FOREIGN PATENT DOCUMENTS

| JP | 9-107694 A | 4/1997 | ............ H02P/5/06 |
|---|---|---|---|

* cited by examiner

*Primary Examiner*—Bentsu Ro
(74) *Attorney, Agent, or Firm*—Birch, Stewart, Kolasch & Birch, LLP

(57) ABSTRACT

When an adjustment switch is turned on, the input of an input changeover switch is switched from a lens controller to a test signal generating circuit. A motor operates in accordance with a test signal of a step waveform outputted from the test signal generating circuit, and a lens moves forward and backward. At this time, a CPU receives a position signal of the lens from a potentiometer to read a response waveform of the position signal responsive to the test signal, and adjusts a feedback gain of an amplifier for feeding back a velocity signal of the movement of the lens to the position command signal, which feedback gain determines transient response characteristics of the movement of the lens, so that the response waveform can become a predetermined form.

4 Claims, 5 Drawing Sheets

F I G. 2
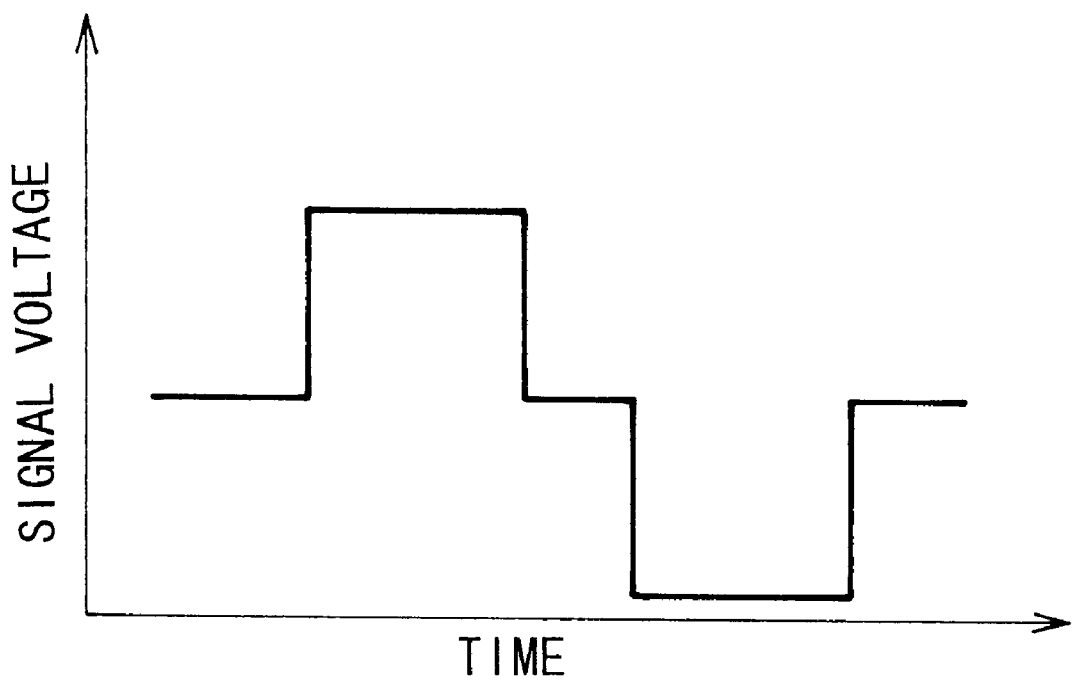

F I G. 4 (A)
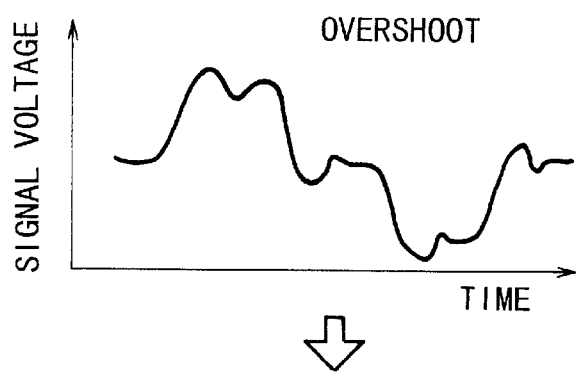
F I G. 4 (B)
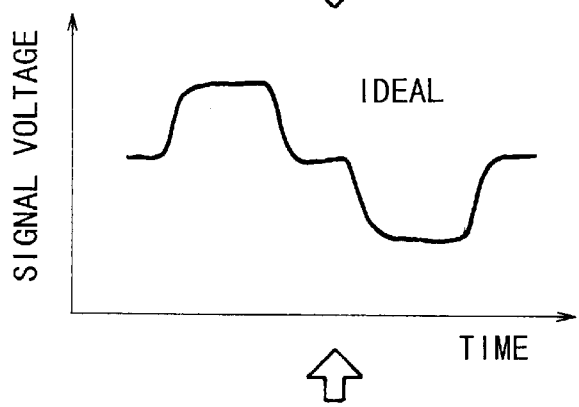
F I G. 4 (C)
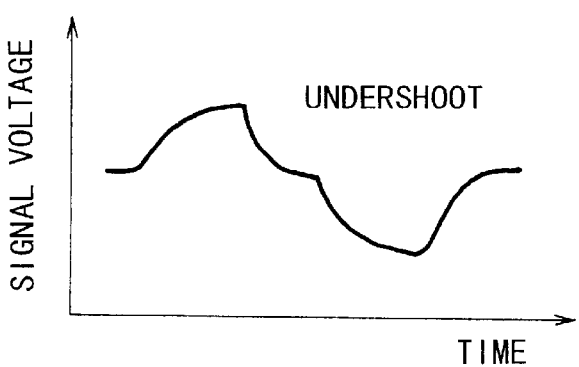

POSITION CONTROLLER

BACKGROUND OF THE INVENTION

1. Field of the Invention

The present invention relates generally to a position controller of a subject, and more particularly to a position controller for driving a camera lens by controlling its position.

2. Description of Related Art

In a motor-driven lens device, which is used for a TV camera, etc., the position of a focus lens is controlled in accordance with a position command signal outputted from a focus demand so that the focus lens can move to a target position corresponding to the operating position of the focus demand. More specifically, a position signal representing the present position of the focus lens is outputted from a potentiometer and is fed back to the position command signal outputted from the focus demand. A focus motor operates in accordance with these signals, so that the focus lens can move to the target position represented by the position command signal.

In order to improve transient response characteristics of the movement of the focus lens with respect to the operation of the focus demand, a velocity signal representing a velocity of the movement of the focus lens is usually fed back to the position command signal. The velocity signal is outputted from a tachogenerator measuring the rotational speed of the focus motor. Adjusting the feedback amount of the velocity signal enables the transient response characteristics of the movement of the focus lens with respect to the operation of the focus demand to be adjusted properly. Japanese Patent Provisional Publication No. 9-107694 discloses a servo system, which feeds back the position signal and the velocity signal to a signal for driving the motor in order to operate the motor stably.

Usually, since the transient response characteristics of the subject are greatly affected by the unevenness in electric circuits and in the frictional resistance and the viscosity resistance of a mechanical part, and the like according to the products, the circuit coefficient is adjusted by a variable resistor in some cases. Therefore, the transient response characteristics are adjusted in different manners between operators. Moreover, even the same operator may change his or her adjustment standards as time passes, and thus, the adjustment results cannot be stable.

SUMMARY OF THE INVENTION

The present invention has been developed in view of the above-described circumstances, and has as its object the provision of a position controller that automatically adjusts the transient response characteristics of the movement of the subject, whose position is controlled, to thereby prevent the unevenness in the transient response characteristics between the products, and easily readjusts the transient response characteristics even if the transient response characteristics change as time passes.

To achieve the above-mention ed object, the present invention is directed to a position controller that receives a position command signal representing a target position to move a subject and feeds back a velocity signal representing a velocity of a movement of the subject to the position command signal at a feedback gain to adjust transient response characteristics of the movement of the subject with respect to the position command signal while moving the subject in accordance with the position command signal, the position controller comprising: a test signal generator for generating a test signal of a predetermined waveform; an input switcher for switching an input to receive the test signal instead of the position command signal; a waveform reader for reading a waveform of a position signal representing a present position of the subject on the movement of the subject in response to the test signal; and a feedback gain adjuster for adjusting the feedback gain of the velocity signal so that the waveform of the position signal responsive to the test signal becomes a predetermined form.

To achieve the above-mentioned object, the present invention is directed to a position controller that receives a position command signal representing a target position to move a subject, feeds back a velocity signal representing a velocity of a movement of the subject to the position command signal at a feedback gain and feeds back a position signal representing a present position of the subject to the position command signal to adjust transient response characteristics of the movement of the subject with respect to the position command signal while moving the subject in accordance with the position command signal, the position controller comprising: a test signal generator for generating a test signal of a predetermined waveform; a test signal adder for adding the test signal to one of the position command signal and the position signal; a waveform reader for reading a waveform of the position signal on the movement of the subject in response to the test signal; and a feedback gain adjuster for adjusting the feedback gain of the velocity signal so that the waveform of the position signal responsive to the test signal becomes a predetermined form.

The test signal generator may generate the test signal of a step waveform.

According to the present invention, the input switcher switches the input to receive the test signal with a predetermined waveform (e.g., a step waveform) instead of the position command signal, or the test signal adder adds the test signal to the position command signal or the position signal. The subject is moved in accordance with the test signal, and the waveform (the response waveform) of the position signal on the movement of the subject in response to the test signal is read. The feedback gain is adjusted so that the response waveform becomes a predetermined form. It is therefore possible to set the optimum transient response characteristics of the movement of the subject automatically. This eliminates the unevenness in the transient response characteristics between the products, and the transient response characteristics can be readjusted easily even if the transient response characteristics are changed due to the changes in the products as time passes.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a view showing the waveform of a test signal that is outputted from a test signal generating circuit;

FIGS. 4(A), 4(B) and 4(C) are views showing response waveforms; and

DETAILED DESCRIPTION OF THE PREFERRED EMBODIMENT

This invention will be described in further detail by way of example with reference to the accompanying drawings.

Figure 1:
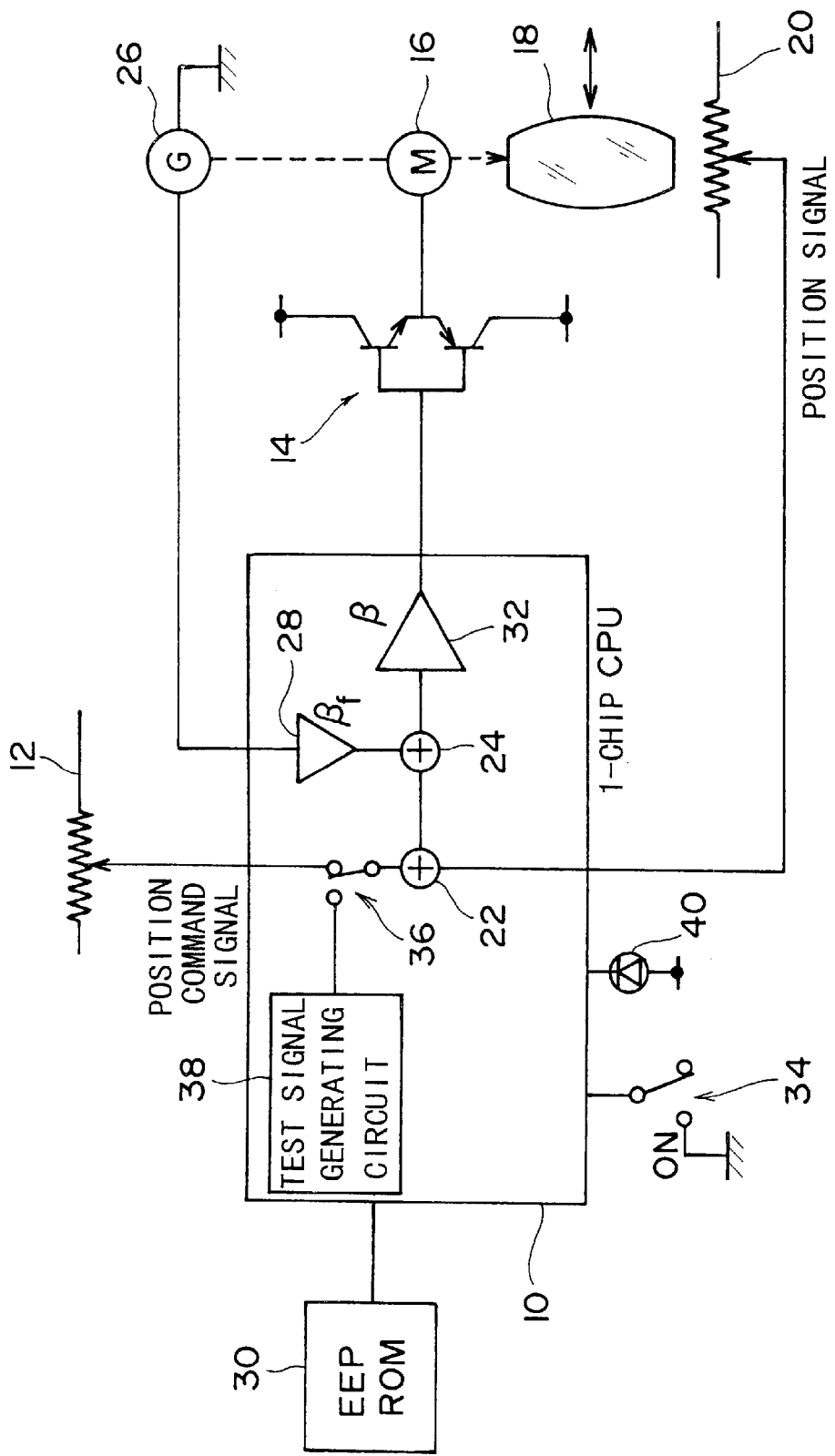
FIG. 1 is a view showing the structure of a lens drive controller according to the first embodiment of the present invention.

FIG. 1 shows the structure of a lens drive controller in a lens device (for a TV camera for example) according to the first embodiment of the present invention. As shown in FIG. 1, the lens drive controller comprises a 1-chip CPU 10, a lens controller 12, a motor drive circuit 14, a motor 16 and a lens 18. The 1-chip CPU 10 is constructed in such a way that the CPU and peripheral circuits (a clock circuit, an A/D converter, a D/A converter, RAM, ROM, communication ports, I/O ports, etc.) are formed on one chip. A variety of operations is performed on the 1-chip CPU 10. In FIG. 1, the operations are represented by equivalent circuits on the 1-chip CPU 10. The 1-chip CPU 10 will hereafter be referred to as the CPU 10.

As shown in FIG. 1, the CPU 10 receives a position command signal from the lens controller 12. A cameraman rotates the lens controller 12, and the CPU receives the position command signal corresponding to the rotational position of the lens controller 12 as a target position to move the lens 18. On the other hand, the CPU 10 receives a position signal representing the present position of the lens 18 from a potentiometer 20, which determines the position of the lens 18.

The CPU 10 adds the position signal outputted from the potentiometer 20 to the position command signal outputted from the lens controller 12 by means of an adder 22. More specifically, the CPU 10 calculate a difference between the target position of the movement of the lens 12 designated by the lens controller 12 and the present position of the lens 12 determined by the potentiometer 20. The position command signal and the position signal are preset so that their signs are inverted when they correspond to one another. When the target position and the present position correspond to one another, the position command signal plus the position signal becomes zero.

An adder 24 receives the difference signal obtained by the adder 22. The adder 24 also receives a rotational speed signal through an amplifier 28. The rotational speed signal is outputted from a tachogenerator 26, which measures the rotational speed of the motor 16, and represents a velocity of the movement of the lens 12. The rotational signal is added to the difference signal.

The amplifier 28 sets a feedback gain $\beta_f$, and the adjustment of the feedback gain $\beta_f$ adjusts the transient response characteristics of the movement of the lens 18 with respect to the position command signal. The CPU 10 automatically adjusts the feedback gain $\beta_f$ to an optimum value in a transient response characteristic automatic adjusting mode, which will be described later. When the power of the lens drive controller is turned on, the CPU 10 sets a gain of the amplifier 28 with reference to the value of the feedback gain $\beta_f$ recorded in an EEPROM 30.

An amplifier 32 receives the difference signal outputted from the adder 24, and it amplifies the difference signal at a preset gain $\beta$. Then, the difference signal is sent to the motor drive circuit 14. The motor drive circuit 14 supplies an electric current, which corresponds to the voltage of the input signal, to the motor 16, so that the motor 16 can be operated. Consequently, the lens 18 moves forward and backward along an optical axis.

The CPU 10 has an adjustment switch 34. If the adjustment switch 34 is off, the above-described normal position control is performed for the lens 18. On the other hand, if the adjustment switch 34 is turned on, the automatic adjustment mode starts for automatically adjusting the transient response characteristics of the movement of the lens 18, and the input of an input changeover switch 36 is switched from the lens controller 12 to a test signal generating circuit 38.

The test signal generating circuit 38 generates a test signal of a step waveform as shown in FIG. 2. If the adjustment switch 34 is turned on and the input of the input changeover switch 36 is switched to the test signal generating circuit 38, the lens 18 is moved in accordance with the test signal as the position command signal. At this time, the CPU 10 receives the position signal of the lens 18 from the potentiometer 20, and reads a waveform of the position signal responsive to the test signal. In accordance with the responsive waveform of the position signal, the CPU 10 finds an optimum value of the feedback gain $\beta_f$ and sets the gain of the amplifier 28 to the optimum feedback gain $\beta_f$ and records the optimum feedback gain $\beta_f$ into the EEPROM 30. When the power of the lens drive controller is turned on, the recorded feedback gain $\beta_f$ is read into the CPU 10 and the gain of the amplifier 28 is set at the read feedback gain $\beta_f$.

Figure 3:
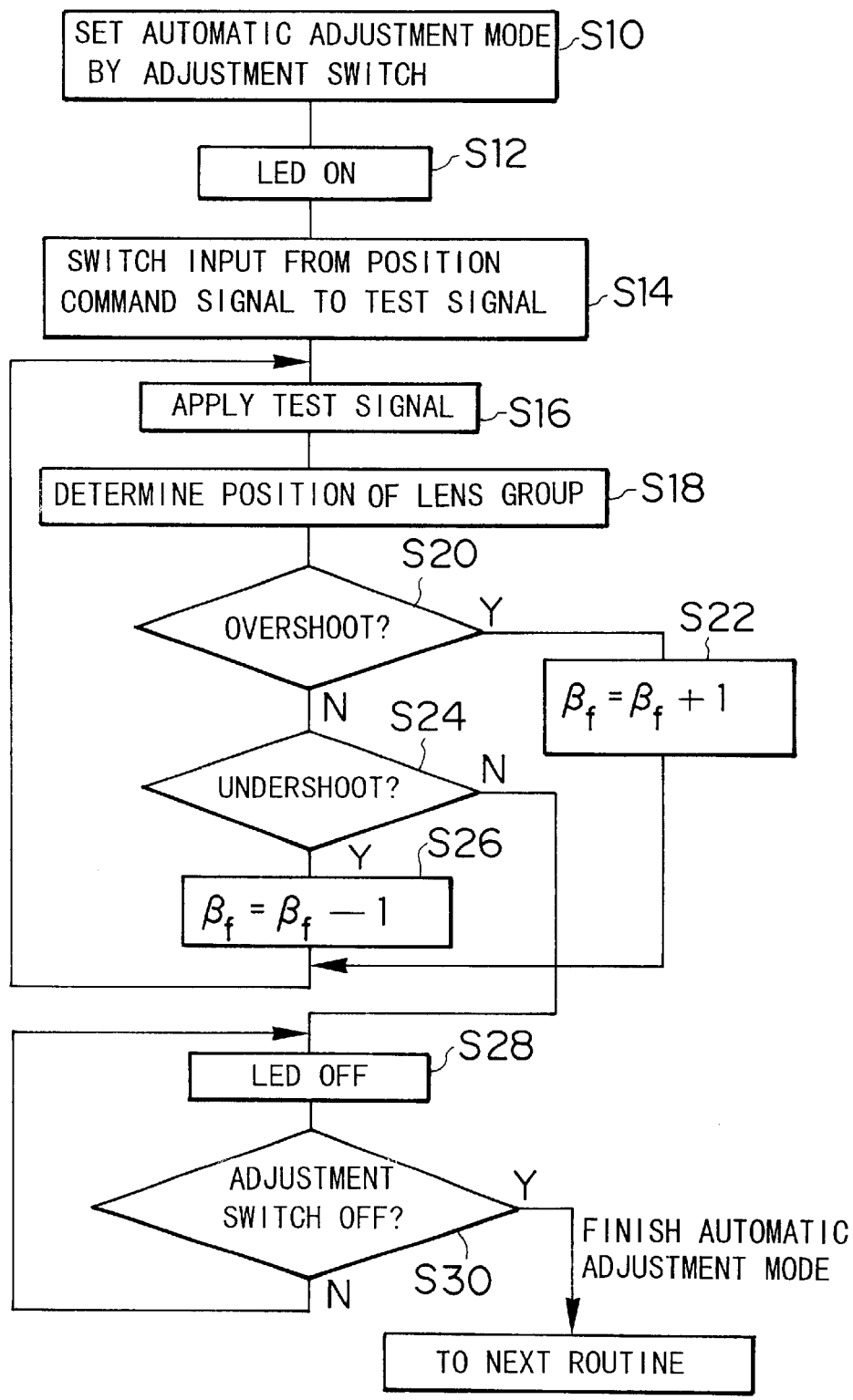
FIG 3 is a flow chart showing a processing procedure of a CPU in a transient response characteristic automatic adjusting mode.

A description will now be given of the processing procedure of the CPU 10 in the transient response characteristic automatic adjusting mode with reference to the flow chart of FIG. 3.

First, the adjustment switch 34 is turned on to set the automatic adjustment mode (S10). Then, the CPU 10 turns on an LED 40 (see FIG. 1) indicating the automatic adjustment mode (S12), and switches the input of the input changeover switch 36 is switched from the lens controller 12 to the test signal generating circuit 38 (S14).

Then, the CPU 10 makes the test signal generating circuit 38 generate the test signal of the step waveform as shown in FIG. 2 (S16), and moves the lens 18 in accordance with the test signal of the step waveform as the position command signal. Then, the CPU 10 receives the position signal of the lens 18 from the potentiometer 20. FIGS. 4(A), 4(B) and 4(C) show the position signal of the lens 18 responsive to the test signal.

Then, the CPU 10 reads a response waveform of the position signal responsive to the test signal and determines whether the waveform is overshoot or not (S20). If the overshoot waveform as shown in FIG. 4(A) is read, the CPU 10 increases the feedback gain $\beta_f$ of the amplifier 28 by 1 (S22) and repeats the procedure from S16. In order to determine whether the waveform is overshoot or not, a response waveform (as shown in FIG. 4(B)) representing the ideal transient response characteristics for the step waveform outputted from the test signal generating circuit 38 is stored in advance, and whether the difference between the ideal response waveform and the waveform read through the potentiometer 20 is permissible or not is determined.

If the response waveform becomes the ideal waveform, which is not overshoot as shown in FIG. 4(B), after the repeated processing from S16 to S22, the present feedback gain of is set as the gain of the amplifier 28 and is recorded into the EEPROM 30.

On the other hand, if the response waveform of the position signal read through the potentiometer 20 is determined as being not overshoot at S20, the CPU 10 determines whether the response waveform is undershoot or not (S24). If the undershoot waveform as shown in FIG. 4(C) is read, the CPU 10 increases the feedback gain $\beta_f$ by −1 (decreases by +1) (S26) and repeats the procedure from S16. Whether the waveform is undershoot or not is determined in the same manner as in the case where whether the waveform is overshoot or not is determined. When the response waveform becomes the ideal response waveform, which is not undershoot as shown in FIG. 4(B), the present feedback gain $\beta_f$ is set as the gain of the amplifier 28 and is recorded into the EEPROM 30.

When the feedback gain $\beta_f$ is adjusted to be the optimum value as a result of the above processing, the LED 40 is turned off (S28) and whether the adjustment switch 34 is turned off or not is determined (S30). If the adjustment switch 34 is turned off, the input of the input changeover switch 36 is switched from the test signal generating circuit 38 to the lens controller 12 to finish the automatic adjustment mode. Then, the next routine will start.

As stated above, the test signal of the predetermined waveform is inputted as the position command signal and the present transient response waveform is read. The feedback gain $\beta_f$ is adjusted automatically so that the transient response waveform becomes the proper response characteristics. This facilitates the adjustment of the transient response characteristics easier and eliminates such a disadvantage that the transient response characteristics are different according to products. If the transient response characteristics are deteriorated by changes in the apparatus as time passes, the transient response characteristics can be readjusted easily by turning on the adjustment switch 34.

In the first embodiment, the input of the input changeover switch 36 is switched from the lens controller 12 to the test signal generating circuit 38 in the transient response characteristic automatic adjustment mode, and the test signal of the step waveform is inputted to the adder 22 instead of the position command signal. The present invention, however, should not be restricted to this. It is also possible to add the test signal outputted from the test signal generating circuit 38 to one of the position command signal and the position signal in the automatic adjustment mode.

Figure 5:
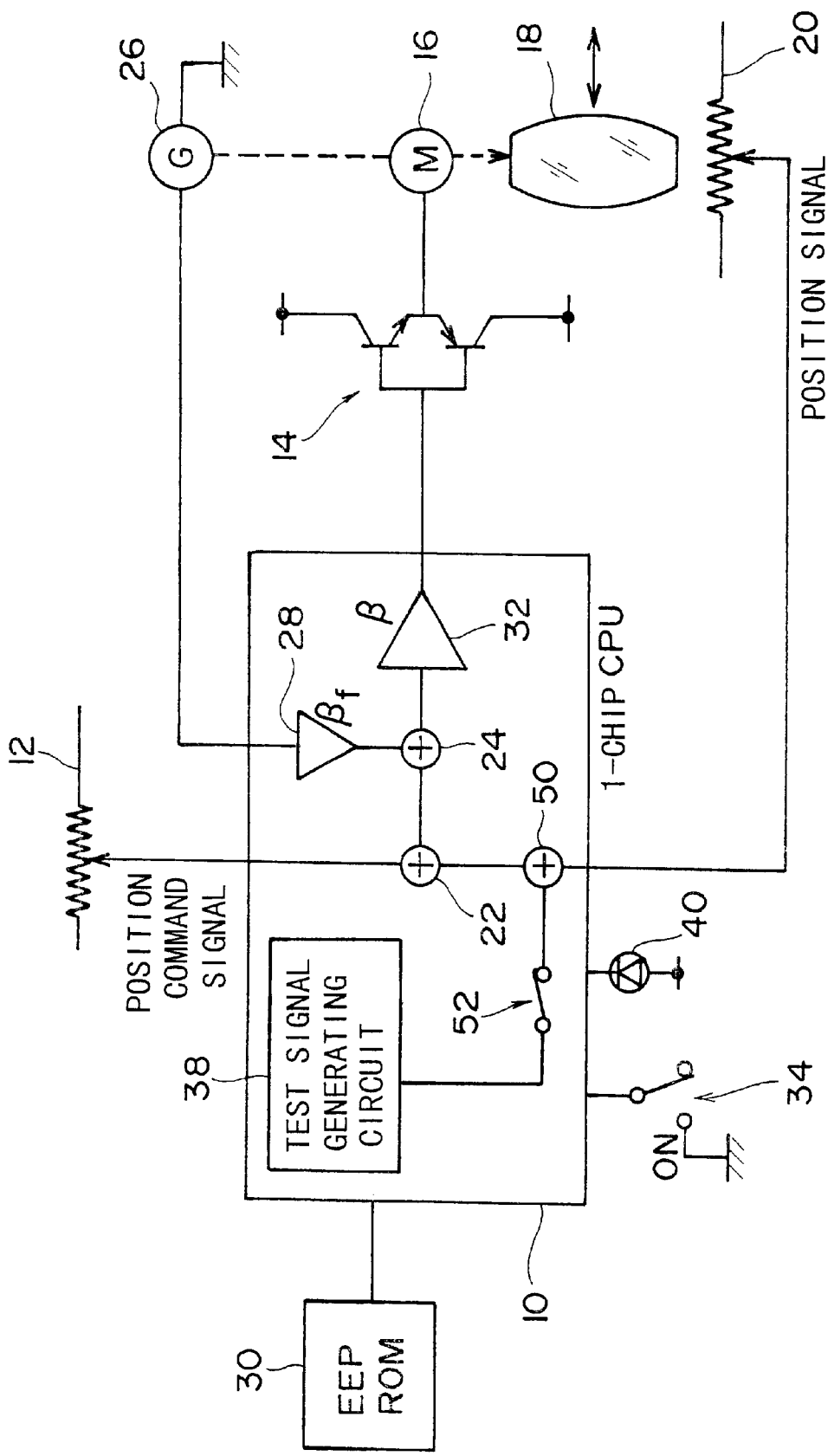
FIG. 5 is a view showing the structure of a lens drive controller according to the second embodiment of the present invention.

FIG. 5 is a view showing the structure of a lens drive controller according to the second embodiment of the present invention. In FIG. 5, parts similar to those described with reference to FIG. 1 are denoted by the same reference numerals. As shown in FIG. 5, a switch 52 and an adder 50 are provided so that the test signal outputted from the test signal generating circuit 38 can be added to the position signal outputted from the potentiometer 20. Then, in the transient response characteristic automatic adjustment mode, the switch 52 is turned on and the test signal is added to the position signal outputted from the potentiometer 20. Consequently, the lens 18 moves in response to the test signal as is the case with the first embodiment, and it is therefore possible to set the proper feedback gain $\beta_f$ by reading the response waveform of the position signal as is the case with the first embodiment.

In the above-described embodiments, the transient response characteristics of the movement of the lens of which position is controlled by the lens drive controller are adjusted automatically, but the present invention may also be applied to automatically adjust transient response characteristics of a movement of an arbitrary subject in a controller that controls the position of the arbitrary subject.

As set forth hereinabove, according to the position controller of the present invention, the subject is moved in response to the test signal of the predetermined waveform (e.g., the step waveform) and the response waveform of the position signal of the subject is read. The feedback gain for determining the transient response characteristics is adjusted so that the response waveform can be suitable. Thus, the transient response characteristics can be adjusted automatically and properly. This eliminates the unevenness in the transient response characteristics between the products. Even if there are changes in the transient response characteristics due to the changes in the apparatus as time passes, it is easy to readjust the transient response characteristics.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A position controller that receives a position command signal representing a target position to move a subject and feeds back a velocity signal representing a velocity of a movement of the subject to the position command signal at a feedback gain to adjust transient response characteristics of the movement of the subject with respect to the position command signal while moving the subject in accordance with the position command signal, the position controller comprising:

a test signal generator for generating a test signal of a predetermined waveform;

an input switcher for switching an input to receive the test signal instead of the position command signal;

a waveform reader for reading a waveform of a position signal representing a present position of the subject on the movement of the subject in response to the test signal; and a feedback gain adjuster for adjusting the feedback gain of the velocity signal so that the waveform of the position signal responsive to the test signal becomes a predetermined form, wherein the subject is a lens in a lens device for a TV camera, the lens being position-controlled by operating a motor.

2. The position controller as defined in claim 1, wherein the test signal generator generates the test signal of a step waveform.

3. A position controller that receives a position command signal representing a target position to move a subject, feeds back a velocity signal representing a velocity of a movement of the subject to the position command signal at a feedback gain and feeds back a position signal representing a present position of the subject to the position command signal to adjust transient response characteristics of the movement of the subject with respect to the position command signal while moving the subject in accordance with the position command signal, the position controller comprising:

a test signal generator for generating a test signal of a predetermined waveform;

a test signal adder for adding the test signal to one of the position command signal and the position signal;

a waveform reader for reading a waveform of the position signal on the movement of the subject in response to the test signal; and a feedback gain adjuster adjusting the feedback gain of the velocity signal so that the waveform of the position signal responsive ti the test signal becomes a predetermined form, wherein the subject is a lens in a lens device for a TV camera, the lens being position-controlled by operating a motor.

4. The position controller as defined in claim 3, wherein the test signal generator generates the test signal of a step waveform.

* * * * *